(12) United States Patent
Erhardt

(10) Patent No.: US 7,058,475 B2
(45) Date of Patent: Jun. 6, 2006

(54) SYSTEM FOR SOFTWARE PLC IMPLEMENTATION FOR PLASTIC MOLDING MACHINES

(75) Inventor: Matthias Erhardt, Marietta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/339,856

(22) Filed: Jan. 10, 2003

(65) Prior Publication Data

US 2003/0182010 A1 Sep. 25, 2003

Related U.S. Application Data

(60) Provisional application No. 60/348,554, filed on Jan. 15, 2002.

(51) Int. Cl.
*G06F 19/00* (2006.01)

(52) U.S. Cl. ............... 700/197; 700/200; 700/202; 700/17

(58) Field of Classification Search ............... 700/197, 700/200, 202, 17
See application file for complete search history.

(56) References Cited

U.S. PATENT DOCUMENTS

| | | | |
|---|---|---|---|
| 4,290,248 A * | 9/1981 | Kemerer et al. ......... 52/309.16 |
| 4,721,589 A * | 1/1988 | Harris ...................... 264/40.1 |
| 5,007,818 A * | 4/1991 | Barancik et al. ............ 425/144 |
| 5,149,193 A * | 9/1992 | Faillace ..................... 366/145 |
| 5,362,222 A * | 11/1994 | Faig et al. .................. 425/145 |
| 5,812,394 A * | 9/1998 | Lewis et al. .................. 700/17 |
| 6,156,842 A * | 12/2000 | Hoenig et al. ............. 525/171 |
| 2003/0232176 A1* | 12/2003 | Polk et al. .................. 428/167 |

OTHER PUBLICATIONS

"Siemens SIMATIC HMI, Panel PC 670 Commissioning Instructions"—Siemens Corporation.*
Siemens Company Webpage—"WinAC Basis/RTX"☐☐http://www.ad.siemens.de/simatic/pcbased/html_76/produkte/pc-based/winsoft.htm.*

* cited by examiner

*Primary Examiner*—Albert W. Paladini
*Assistant Examiner*—Michael D. Masinick

(57) ABSTRACT

A system for integrating a software programmable logic controller functions along with the human machine interface functions for plastics molding machines is disclosed. A general purpose computer integrates the programmable logic controller functions of monitoring and controlling input output devices and sensors along with the human machine interface functions of monitoring and presenting the status of the plastics molding to an operator. Through this system, primarily the data latency exhibited between the human machine interface and the programmable logic controller are eliminated, along with the cost of maintenance and upgrade of the machine.

7 Claims, 2 Drawing Sheets

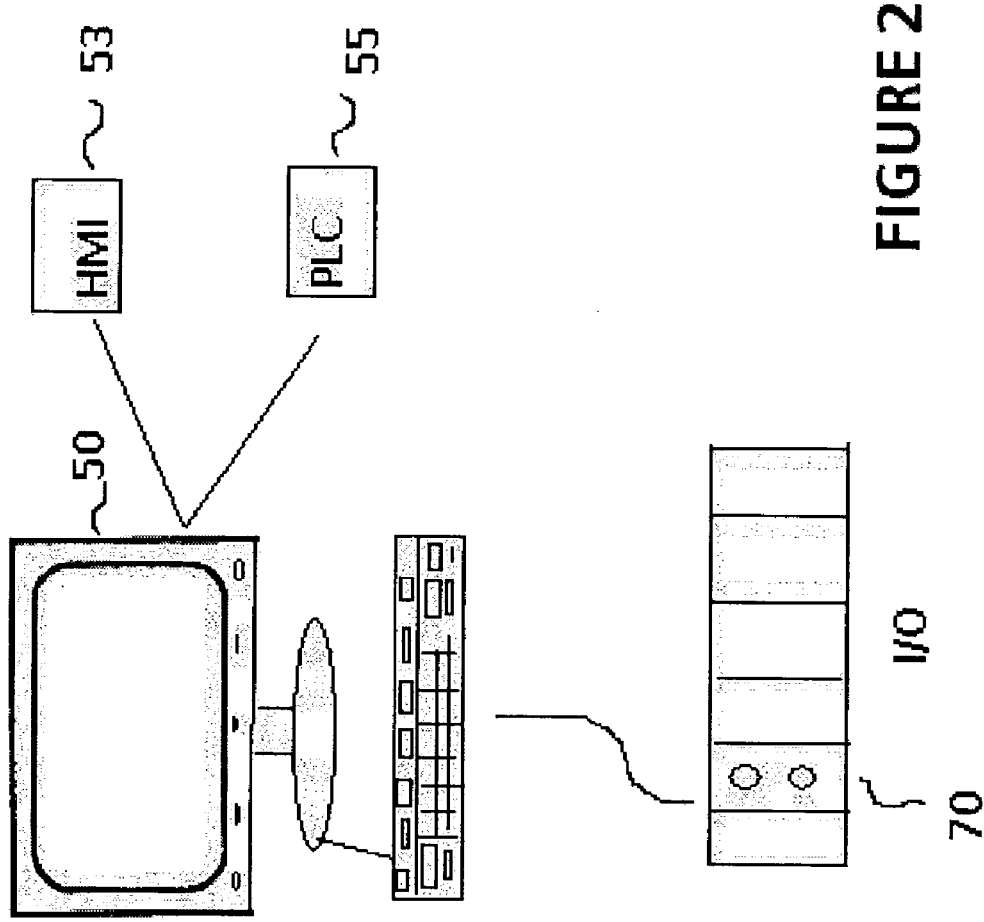

SYSTEM FOR SOFTWARE PLC IMPLEMENTATION FOR PLASTIC MOLDING MACHINES

CROSS-REFERENCE TO RELATED APPLICATIONS

This application claims the benefit under 35 U.S.C. § 119(e) of U.S. Provisional Application No. 60/348,554 filed on Jan. 15, 2002 which is herein incorporated by reference.

TECHNICAL FIELD

This invention relates generally to plastic molding machine automation solutions. In particular, the invention pertains to plastic molding machine automation solutions which integrates the functions of the programmable logic controller and the human machine interface into a single processor.

BACKGROUND ART

Traditionally, most plastic molding machine automation solutions consist of at least two distinct elements. The first element is a dedicated programmable logic controller ("PLC") which controls the real-time digital and analog functions of the machine. The PLC typically stores and executes a control program to control various input/output ("I/O") devices and thereby control the operational sequences of the I/O devices. The second element is a human machine interface ("HMI") which allows the operator to change and view the processes of the machine. The HMI is usually in the form of an operator station, which runs software that allows the operator to control the machine's functions.

There are drawbacks associated with the traditional plastic molding machine solution is many. First, the PLC has relatively limited processing power. The limited processing power or processing speed of the PLC may prevent the optimal efficient operation of the molding machine. Second, PLC technology is typically proprietary to the manufacturer of the PLC and upgrading and maintaining the PLC is typically at the whim of the PLC manufacturers. Thirdly, the process control program is typically written in arcane and complex low level language. Purchasers and other end users of PLCs must be trained to make even minor modifications to the control programs.

Aside from these two key elements, a plastic molding machine may also include a dedicated motion controller to provide real-time servo control. In some instances, the functionality of the motion controller may be included in the PLC. Additionally, a plastic molding machine may include temperature control. Stand-alone dedicated temperature controller may provide this functionality or it may be included in the PLC. Other I/O devices may further be included in the plastic molding machine, primarily dependent upon whether the plastics molding machine is used to support extrusion, injection molding, blow molding or thermoforming.

Information exchange between the operator station and the machine control traditionally has been done via a data network. Examples of the data network would be Profibus, Ethernet and other serial data networks. However, using this type of communication path introduces data latencies between the machine control (PLC functions) and the operator station (HMI functions). Furthermore, on plastic molding machines particularly, it is necessary to pull large quantities of data from the PLC to the operator station. For example, in blow molding machines, it is necessary to quickly download and upload the parison set point and actual value tables between the PLC and the HMI.

Therefore, there is a need for a plastic molding machine automation solution which can reduce the latencies involved in communication between the PLC and the HMI over a data network so that the plastic molding machine can operate at a more efficient speed.

SUMMARY OF THE INVENTION

According to one aspect of the invention, there is provided a system for automating regulation functions of plastic processing machines, said system comprising: an input/output device for monitoring and controlling functions associated with plastics processing; an interface for monitoring the status of said plastics processing and presenting said status to an operator; and a general purpose computer functionally coupled to said input/output device and said interface, said general purpose computer adapted for controlling functions of said input/output device and for controlling said interface to said operator.

BRIEF DESCRIPTION OF THE FIGURES

The present invention will now be described with reference to the accompanying drawings wherein:

FIG. 2 is a schematic view of a plastics molding machine in accordance with the principles of the present invention.

DETAILED DESCRIPTION OF THE FIGURES

Figure 1:
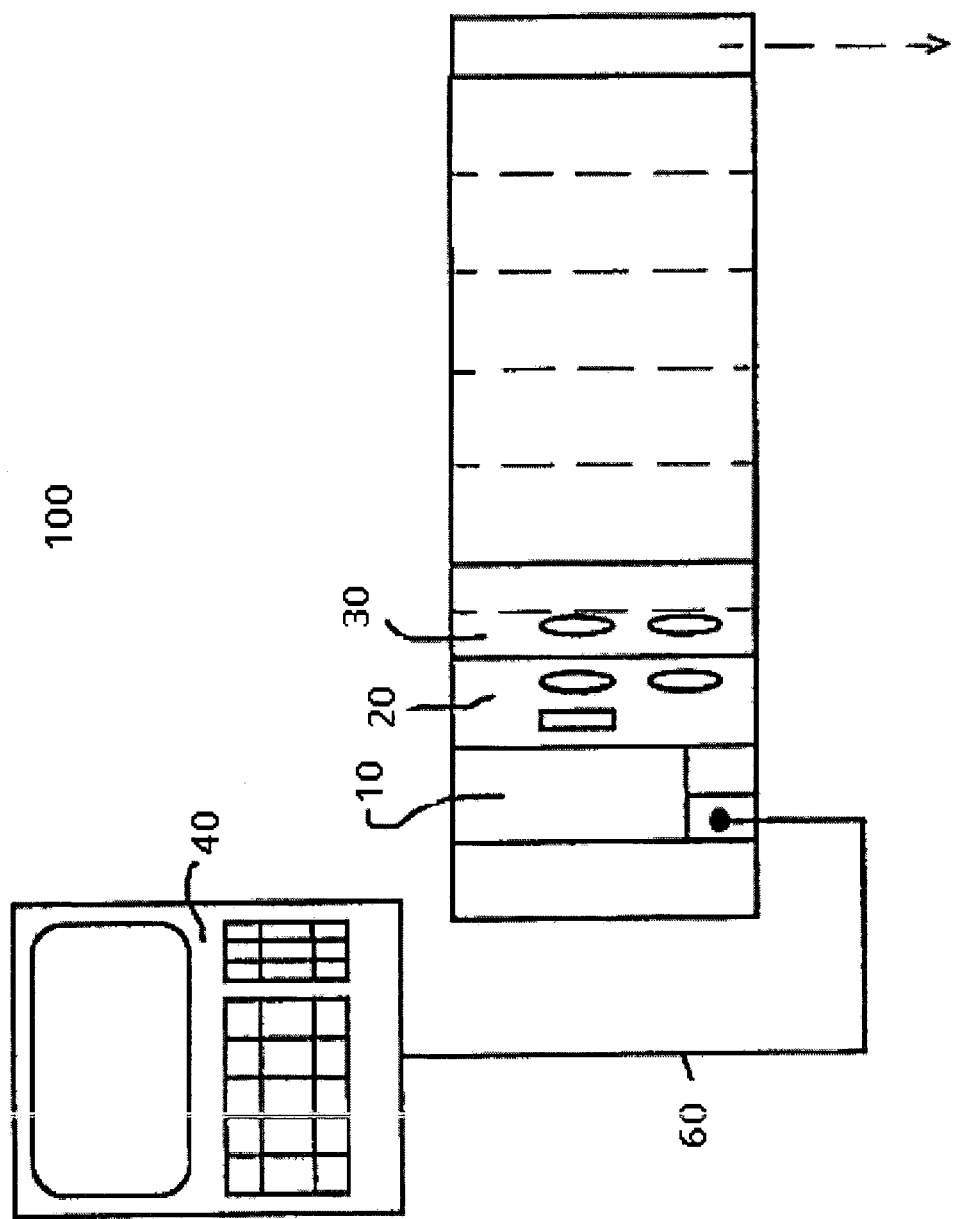
FIG. 1 is a schematic view of a conventional plastics molding machine.

The objective of the invention to reduce latencies in data exchange between the HMI and the PLC associated with traditional architectures for plastic molding machine automation solutions. The objectives are accomplished by moving PLC functionality onto the HMI platform. To review, the PLC controls the real-time digital and analog functions of the machine. The PLC furthermore controls the temperature of the molding machine via implemented software based temperature controls. The digital and analog inputs and outputs required for control are connected to HMI via a high speed interface. Furthermore a dedicated motion controller may be used to provide fast servo control. The motion controller is necessary in the case of blow molding machines to provide parison control functionality and. In the case of injection molding machines, the motion controller can provide the closed loop injection control. The motion controller is also connected to the HMI via a high speed interface.

The principles of the invention will be illustrated through a description of the plastic molding machine automation solution provided by Siemens Energy & Automation, Inc., the assignee of the present invention. While this solution constitutes an embodiment of the present invention, it is not the intention of applicants to limit the scope of the invention to the particular details of this engine. Rather, it is the intention of the applicants that the invention be defined by the appended claims and all equivalents thereto.

Generally, plastics processing machines controlled by means of programmable logic controllers are well known in the art. It has been customary in the past to use specialized hardware components such as special assemblies to automate machines in the plastics industry., These special assemblies have hardware and software specifically designed for specific repetitive tasks. For instance, for blow molding machines, the special assemblies may have functional blocks for temperature closed-loop control, travel sensing and wall thickness open-loop control and mandrel position closed loop control.

Referring to FIG. 1, there is shown a schematic view of a conventional plastics molding machine 100. Human machine interface 40 is coupled to the programmable logic controller 10 via a data line 60. Functional assemblies 20 and 30 interact with the PLC 10 and are usually placed in the vicinity of the PLC (i.e. in the same rack). Typically, the functional assemblies are interconnected by means of a rear-mounted bus (not shown) to enable communication between the assemblies. It will be understood that a plurality of assemblies can be coupled to a single PLC 10.

Referring to FIG. 2, there is shown a schematic view of the details of an automation system in accordance with the principles of the present invention. The functional assemblies are described in turn. A general purpose computer 50 controls the HMI 53 and PLC 55 functions integrated in a single processor. In a preferred embodiment, the general purpose computer is a Siemens PC670 model available from Siemens Energy & Automation, Inc. of Alpharetta, Ga. The general purpose computer operates on generally available operating systems and executes control programs for controlling the typical HMI and PLC functions. The general purpose computer 50 is functionally coupled to, in this case, a dedicated motion controller 70. It will be understood that the motion controller is representative of a whole host of potential input/output devices which the general purpose computer could be coupled with. The coupling is preferably via a high speed communication interface card (not shown). In a preferred embodiment, the high speed communications interface card is a Siemens CP5613 available from Siemens Energy & Automation, Inc. Additionally, in a preferred embodiment, the dedicated motion controller 70 is a Delta Computer Systems RMC100 available from Delta Computer Systems of Vancouver, Wash. Additional functional assemblies may be added to the base configuration as needed. For example, such assemblies may include additional analog and digital inputs and outputs dependent upon the type of plastic processing the plastic processing machine is intended to implement.

The general purpose computer operates on the Microsoft Windows NT 4.0 operating system. The HMI software is commercially available from Siemens. In a preferred embodiment, the HMI software is Siemens Pro Tool Pro available from Siemens Energy & Automation, Inc. of Alpharetta, Ga. The software based PLC is a Siemens WinAC RTX. WinAC RTX software runs on the Windows NT 4.0 platform and emulates a programmable logic controller. WinAC RTX runs a real-time computer based solution for automation solutions. Coupled to a Profibus or any other data network to the I/O devices, WinAC allows the real-time control of a plurality of I/O devices over the network.

Application code is necessary to combine the components of the plastic molding machine automation solutions system together. A software based temperature control application running on the software based PLC to handle the communication from the motion controller. A communication package manages the data transfer between the software based PLC and the dedicated motion controller. A set of visualization screens to visualize temperature control and the motion control functionalities of the machine for the operator and serves as the HMI. Additionally, for blow molding applications, a special ActiveX controller embedded in the HMI package to enable graphic editing of the parison profile. Also included is the programming necessary to interface the ActiveX controller to the visualization software. The temperature control includes an integrated software based temperature control including auto tuning.

In summary, the CPU of the general purpose computer is used as the basis for a comprehensive technological solution to control and monitor any functional assemblies to provide a complete open-loop and closed-loop control system to meet any desired technological requirements in plastics machines. The latencies of data transmission between the HMI and the PLC is eliminated since the HMI functionality and the PLC functionality is integrated in a single general purpose computer. Additionally, the cost of the plastics processing machine automation solution is drastically reduced because of the absence of a dedicated programmable logic controller. The ease of use of the solution is also increased because of the increased use of standardized components, making upgrade and maintenance of the machine easier.

The above described embodiments are merely exemplary. Those of ordinary skill in the art may readily devise their own implementations that incorporate the principles of the present invention and fall within the spirit and scope thereof.

What is claimed is:

1. A system for automating regulation functions of a plastic processing machine, said system comprising:
   a human machine interface module comprising executable instructions for allowing a user to view and change functions of the plastic processing machine;
   a programmable logic controller module comprising executable instructions for storing and executing a control program to control various functions associated with the plastic processing machine;
   a general purpose computer, wherein the general purpose computer is configured to execute the instructions of the human machine interface module and the programmable logic controller module on a single integrated processor to eliminate data latencies between the instructions of the human machine interface module and the programmable logic controller module; and
   a dedicated motion controller, wherein the dedicated motion controller is coupled to the general purpose computer.

2. The system of claim 1, wherein the dedicated motion controller is coupled to the general purpose computer via a high speed communication interface card.

3. The system of claim 1, wherein said plastics processing is a blow molding machine.

4. The system of claim 1, wherein said plastics processing machine is an injection molding machine.

5. The system of claim 1, wherein said plastics processing machine is an extrusion machine.

6. The system of claim 1, wherein said plastics processing machine is a thermoforming machine.

7. The system of claim 1, wherein the programmable logic controller module further comprises executable instructions for temperature control of the dedicated motion controller.

* * * * *